Aug. 18, 1964 N. F. KFOURY 3,145,012
ALL-DIRECTIONAL FRICTIONAL DAMPER
Filed July 16, 1962
FIG.I.
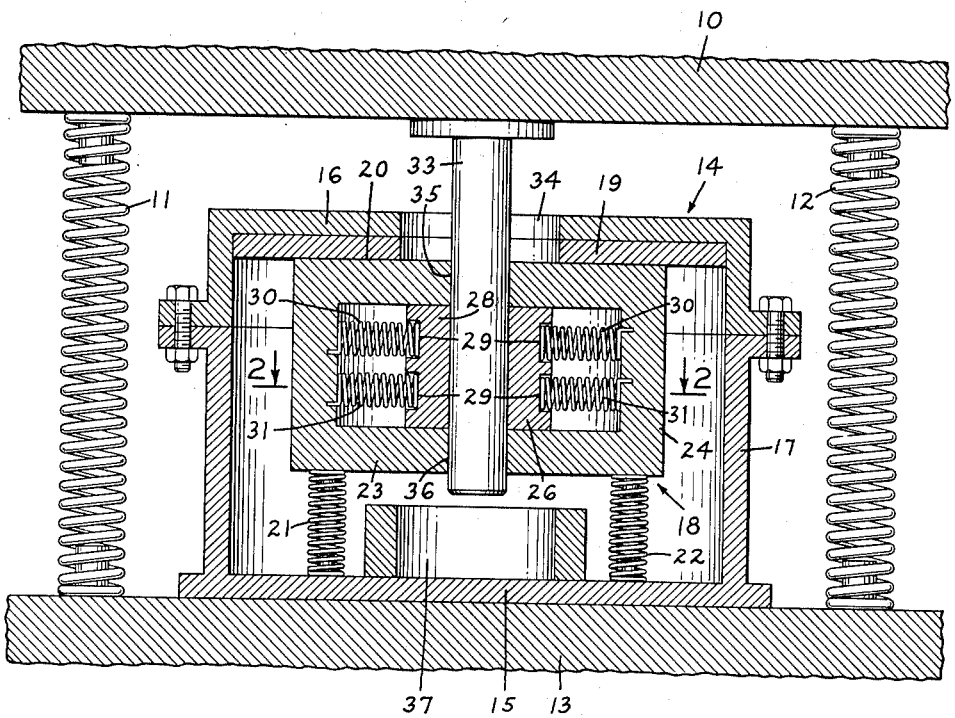
FIG.2.
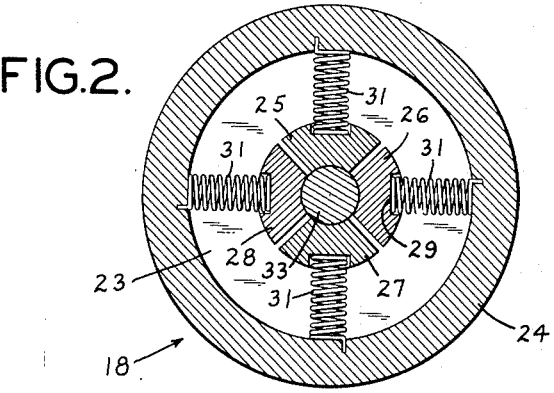
INVENTOR
NICHOLAS F. KFOURY
BY
HIS ATTORNEYS

United States Patent Office 3,145,012
Patented Aug. 18, 1964

3,145,012
ALL-DIRECTIONAL FRICTIONAL DAMPER
Nicholas F. Kfoury, Manorhaven, N.Y., assignor to Korfund Dynamics Corporation, Long Island City, N.Y., a corporation of New York
Filed July 16, 1962, Ser. No. 209,949
5 Claims. (Cl. 248—358)

This invention relates to vibration dampers and relates particularly to dampers for damping vibrations in all directions with constant force and with a square wave pattern.

In accordance with the invention, a novel form of vibration damper is provided which is capable of damping vibrations which occur in any direction and with an essentially constant damping action regardless of the amplitude of the vibration.

More particularly, in accordance with the invention, a vibration damper is provided which involves the use of friction elements engageable with a moving part which are biased against that part with substantially constant pressure and frictionally oppose movements of the part. Lateral movement of the part is damped by friction elements which also oppose lateral vibration with substantially constant resistance, regardless of the extent of the vibration, thereby producing an efficient attenuation of vibrations in all directions.

In a typical device, the vibration damper includes a first housing which has a layer of friction material therein against which a second housing is biased by means of springs or the like. The second housing and the layer of friction material serve to dampen lateral vibrations. Mounted within the second housing are a plurality of slidable friction elements which engage the housing and the vibrating element and resist its movement at least in a direction substantially perpendicular to the direction of lateral vibration. In this way, vibrations occurring in any direction are resisted and dissipated by the damper. The new dampers may be used in combination with spring supporting elements and are useful for isolating machines, instruments and the like from sources of the shock and vibration.

For a better understanding of the present invention, reference may be had to the accompanying drawings, in which:

FIGURE 1 is a view in vertical section through a typical vibration damper embodying the present invention; and FIGURE 2 is a view in section taken on line 2—2 of FIGURE 1.

For purpose of illustration, the new vibration damper embodying the present invention will be described in connection with a mass 10 such as an instrument platform, a machine base or the like which is supported by means of a plurality of springs 11 and 12 on a base 13. The springs have a shock isolating function but very little damping action after being subjected to compression or extension.

A typical vibration damper embodying the present invention as illustrated in FIGS. 1 and 2 includes a housing 14 which may be of any suitable shape, such as cylindrical, rectangular or the like, and having a bottom 15, a top 16 and a side or sides 17. The sides may be closed, perforated or open. Within the housing 14 is a second smaller housing 18 of less height and less transverse dimensions than the housing 14 so that it is capable of substantial movement in all directions within the housing 14. The smaller housing 18 may be introduced into the housing 14 by making the latter in two sections and bolting them together.

The under and inner surface of the top 16 of the outer housing 14 is provided with a layer 19 of friction material, such as material used for automotive brake linings, sintered metal brake lining material or the like and is in contact with the top surface 20 of the smaller housing 18. If desired, the brake material may be mounted on the top of the housing 18. In order to afford the proper frictional engagement between the housing 18 and the layer 19, a series of springs 21 and 22 are interposed between the bottom 15 of the housing 14 and the bottom 23 of the housing 18. The strength and number of these springs will determine the friction and the amount of damping of the lateral movement of the housing 18. As shown in FIG. 2, the housing 18 is of generally circular cross-section having a cylindrical outer wall 24 although it may be any other suitable shape in cross-section. Disposed within the housing 18 are four arcuate brake or friction elements 25, 26, 27 and 28. While the four friction elements are illustrated, two, three or more than four of such elements can be provided if desired. The outer surfaces of the brake or friction elements 25 to 28 have recesses 29 for receiving inner ends of springs 30 and 31 biasing the friction or brake elements toward each other. The number of springs and the strength of the springs may be varied depending on the friction desired. The friction elements 25 to 28 engage a shaft 33 which is fixed to the under surface of the platform 10 and extends through openings 34 in the top of the housing 14 and openings 35 and 36 in the top and bottom of the inner housing 18. The shaft 33 is of smaller diameter than the opening 34 thereby allowing the shaft substantial lateral movement relative to the housing 14. With the structure thus described, it will be clear that the brake or friction elements 25, 26, 27 and 28 will be urged against the shaft 33 and inasmuch as they are in slidable engagement with the top and bottom of the housing 18, they frictionally oppose the vertical and rotational movement of the shaft 33. The springs 30 and 31 maintain a substantially constant frictional engagement between the shaft 33 and the friction elements 25 to 28 so that regardless of the vertical and rotational amplitude of vibration of the shaft, a substantially constant damping effect is obtained.

In a like fashion, lateral movement of the shaft 33 is damped by the engagement of the housing 18 with the layer 19 of friction material. By making the springs 21 and 22 of appropriate strength, lateral movement of the shaft 33 relative to the housing 14 can be kept within the limits of the size of the opening 34 and the lateral movement effectively damped.

While it is not necessary, the outer housing 14 may be provided with ribs or flanges 37 of straight, rectangular or circular form to support the housing 18 while the shaft 33 is being inserted into the housings 14 and 18 and to facilitate the assembly of the housings 14 and 18. The upper edge of the flanges 37 should be spaced substantially from the bottom of the housing 18 to allow the housing 18 to move more readily without transmitting vibrations between the shaft 33 and the base 13.

While all directional friction dampers of the type disclosed herein are adapted particularly for heavy duty service for damping powerful vibrations of substantial amplitude, nevertheless they can be made in smaller sizes for use with light machinery applications, for laboratory equipment such as scales, and the like and the springs and friction material used therein can be varied in accordance with the purpose desired.

Accordingly, the form of the invention described herein should be considered as illustrative.

I claim:

1. A vibration damper comprising a shaft adapted to be attached to a vibratile member, friction members engaging said shaft slidably, means biasing said friction members against said shaft, a housing slidably receiving said shaft for relative axial movement and movable with said shaft in directions transverse to said axis of said shaft, said friction members and said biasing means, being mounted in said housing, a fixed member, friction means interposed between said housing and said fixed member and disposed in a plane substantially perpendicular said shaft and biasing means urging said housing, said fixed member and said friction means together.

2. A vibration damper comprising a first housing having a top and sides, said top having an aperture therein, a smaller housing in said first housing, said smaller housing having a top, sides and bottom and an opening in said top, friction means interposed between the tops of said housings, engaged thereby, and fixed to one of said tops, springs in said first housing engaging said smaller housing and biasing said tops against said friction means, a shaft extending through said aperture and said openings and spaced from said top, sides and said bottom of said first housing, friction members movably mounted in said smaller housing for engaging said shaft, and spring means interposed between the sides of said smaller housing and said friction members for biasing said friction members against said shaft.

3. The vibration damper set forth in claim 2 in which said shaft is of circular cross-section and said friction members have complementally shaped surfaces peripherally engaging said shaft.

4. A vibration damper comprising an element to be damped, a first friction member slidably engaging said element and frictionally resisting movement of said element in one direction, a fixed member, means movably supporting said first friction member, said movable supporting means having a surface, a second friction member interposed between said fixed member and said surface and means resiliently urging said surface, said second friction member and said fixed member together.

5. A vibration damper comprising a first housing having sides, top and bottom, said top having an aperture therein, a second housing having sides, top and bottom, said second housing being smaller than and disposed within said first housing and movable in all directions relative thereto, spring means urging the top of said smaller housing toward the top of said first housing, a layer of friction material interposed between said tops of said housings and fixed relative to one of said tops, aligned openings in the top and bottom of said smaller housing, a member of substantially smaller diameter than said aperture and extending through said openings and aperture, a plurality of friction elements slidably mounted in said smaller housing in engagement with the top and bottom thereof and engaging said member and spring means in said smaller housing engaging said friction elements and biasing them against said member.

References Cited in the file of this patent
UNITED STATES PATENTS

| | | |
|---|---|---|
| 2,683,015 | Campbell | July 6, 1954 |
| 2,683,016 | Campbell | July 6, 1954 |